United States Patent
Richter et al.

(10) Patent No.: US 9,962,648 B2
(45) Date of Patent: May 8, 2018

(54) CARBON MEMBRANE, PROCESS FOR THE MANUFACTURE OF CARBON MEMBRANES AND USE THEREOF

(71) Applicants: Fraunhofer-Gesellschaft zur Foerderung der angewandten Forschung e. V., Munich (DE); MUW SCREENTEC Filter- und Praezisionstechnik aus Metall GmbH, Wittingen (DE)

(72) Inventors: Hannes Richter, Hermsdorf (DE); Susanne Kaemnitz, Rauschwitz (DE); Joerg Gruetzner, Schildow (DE); Dirk Martin, Erfurt (DE); Ingolf Voigt, Jena (DE)

(73) Assignee: FRAUNHOFER-GESELLSCHAFT ZUR FOERDERUNG DER ANGEWANDTEN FORSCHUNG E. V., Munich (DE)

( * ) Notice: Subject to any disclaimer, the term of this patent is extended or adjusted under 35 U.S.C. 154(b) by 59 days.

(21) Appl. No.: 14/970,199

(22) Filed: Dec. 15, 2015

(65) Prior Publication Data
US 2016/0175767 A1    Jun. 23, 2016

(30) Foreign Application Priority Data
Dec. 17, 2014   (DE) .......................... 10 2014 118 892

(51) Int. Cl.
*B01D 53/26* (2006.01)
*B01D 71/02* (2006.01)
(Continued)

(52) U.S. Cl.
CPC ....... *B01D 53/268* (2013.01); *B01D 67/0067* (2013.01); *B01D 69/02* (2013.01);
(Continued)

(58) Field of Classification Search
CPC .............. B01D 19/0031; B01D 53/228; B01D 53/268; B01D 2053/221; B01D 67/0067;
(Continued)

(56) References Cited

U.S. PATENT DOCUMENTS 3,859,421 A     1/1975  Hucke
4,978,430 A *  12/1990  Nakagawa ............. B01D 53/22
                                                    159/DIG. 27
(Continued)

FOREIGN PATENT DOCUMENTS

DE         19917812 A1    10/2000
EP          2045001 A1     4/2009
(Continued)

OTHER PUBLICATIONS

Saufi S.M. et al., "Fabrication of carbon membranes for gas separation—a review", www.sciencedirect.com, Carbon 42 (2004) 241-259, 19 pgs.
(Continued)

*Primary Examiner* — Jason M Greene
(74) *Attorney, Agent, or Firm* — Abel Law Group, LLP

(57) ABSTRACT

The invention relates to a permselective membrane (1) for removal of water from water-containing gas mixtures, said permselective membrane (1) being a carbon membrane of a material whose structure is graphite similar and formed by at least one sequence of layers of the material, the layers being arranged in planes, adjacent layers having an average distance between the layers of less than 0.45 nm (4.5 Å), and the sequence of layers being turbostratically disordered. The invention further relates to processes for preparing membrane (1) and to uses of membrane (1) for exchanging water between two gas streams and also for removing water from chemical equilibrium reactions. Assemblies comprising membrane (1) on porous ceramic carriers (2) and appara-
(Continued)

tuses for separating water from a water-containing gas mixture are also described.

12 Claims, 3 Drawing Sheets

(51) Int. Cl.
B01D 53/22 (2006.01)
B01D 67/00 (2006.01)
H01M 8/04 (2016.01)
B01D 69/02 (2006.01)
H01M 8/04119 (2016.01)
H01M 8/04828 (2016.01)
H01M 8/04014 (2016.01)

(52) U.S. Cl.
CPC ......... B01D 71/021 (2013.01); B01D 71/025 (2013.01); H01M 8/04014 (2013.01); H01M 8/04141 (2013.01); H01M 8/04149 (2013.01); H01M 8/04156 (2013.01); H01M 8/04835 (2013.01); B01D 53/228 (2013.01); B01D 2323/30 (2013.01); B01D 2325/20 (2013.01); Y02P 70/56 (2015.11)

(58) Field of Classification Search
CPC ...... B01D 69/02; B01D 69/08; B01D 71/021; B01D 2257/80; B01D 2325/02; H01M 8/04141; H01M 8/04149
See application file for complete search history.

(56) References Cited

U.S. PATENT DOCUMENTS

| | | | | |
|---|---|---|---|---|
| 5,976,324 | A * | 11/1999 | Groschl | B01D 53/268 159/DIG. 27 |
| 7,344,585 | B1 * | 3/2008 | Kulprathipanja | B01D 53/228 95/45 |
| 8,608,828 | B2 | 12/2013 | Voss et al. | |
| 9,611,187 | B2 * | 4/2017 | Gruetzner | C07C 1/12 |
| 2002/0058172 | A1 | 5/2002 | Datz | |
| 2003/0034295 | A1 | 2/2003 | Strano et al. | |
| 2003/0083534 | A1 | 5/2003 | Gauthier et al. | |
| 2008/0105613 | A1 | 5/2008 | Ichikawa et al. | |
| 2010/0009226 | A1 * | 1/2010 | Konrad | H01M 8/04014 429/415 |
| 2012/0079944 | A1 * | 4/2012 | Vo | B01D 67/0067 96/11 |
| 2012/0247338 | A1 * | 10/2012 | Bauer | H01M 2/1241 96/6 |
| 2012/0312161 | A1 * | 12/2012 | Reitzle | B01D 53/268 95/45 |
| 2013/0081991 | A1 | 4/2013 | Ito et al. | |

FOREIGN PATENT DOCUMENTS

| | | |
|---|---|---|
| JP | H10085567 A | 4/1998 |
| WO | 2009110001 A1 | 9/2009 |
| WO | 2012041998 A1 | 4/2012 |
| WO | 2012041999 A1 | 4/2012 |

OTHER PUBLICATIONS

Ohya et al. "Methanation of carbon dioxide by using membrane reactor integrated with water vapor permselective membrane and its analysis" Journal of Membrane Science 131 (1997) 237-247, 11 pgs.

Fitzer, E., "Thermischer Abbau von Polymeren bis zum elementaren Kohlenstoff—ein Weg zu Werkstoffen der Zukunft", Angew. Chem. 92, pp. 375-386 (1980).

Boeder, H. et al. "Neue Formen elementaren Kohlenstoffs", Naturwissenschaften, 57: 29-36 (1970).

Yoshimune, M., et al. "Alcohol dehydration by pervaporation using a carbon hollow fiber membrane derived from sulfonated poly(phenyleneoxide)", Journal of Membrane Science 425: 149-155 (2013).

* cited by examiner

| Gas | $H_2$ | $CO_2$ | $O_2$ | $N_2$ | $CH_4$ | $C_3H_8$ | $C_4H_{10}$ | $SF_4$ |
|---|---|---|---|---|---|---|---|---|
| kinetic molecular diameter [nm] | 0.29 | 0.33 | 0.35 | 0.36 | 0.38 | 0.43 | 0.47 | 0.51 |
| permeance [l / (m² h bar)] | 2767.0 | 779.8 | 155.6 | 37.8 | 15.5 | 0.4 | 0.3 | 0.1 |

Fig. 4

| T [C°] | $p_{feed}$ [bar] | $p_{permeate}$ [bar] | g | $P_{H2O}$ [m³/m² h bar] | $P_g$ [m³/m² h bar] |
|---|---|---|---|---|---|
| 150-280 | 8-11 | 1 | $N_2$ | 6 | 0.00 |
| 200 | 11 | 1 | $H_2$ | 8 | 0.055 |
| 250 | 11 | 1 | $CH_4$ | 6 | 0.00 |
| 200 | 11 | 1 | $CO_2$ | 6 | 0.030 |

Fig. 5

CARBON MEMBRANE, PROCESS FOR THE MANUFACTURE OF CARBON MEMBRANES AND USE THEREOF

CROSS-REFERENCE TO RELATED APPLICATIONS

The present application claims priority under 35 U.S.C. § 119 of German Patent Application No. 102014118892.6, filed Dec. 17, 2014, the entire disclosure of which is expressly incorporated by reference herein.

BACKGROUND OF THE INVENTION

1. Field of the Invention

The present invention relates to membranes, processes for preparing a membrane of carbon and the use thereof.

2. Background of the Invention

Carbon is characterized by an interplanar spacing of the graphite which, at 3.35 Å, is on the order of magnitude of small gas molecules. It is known that carbon prepared in the form of a membrane can be utilized for gas separation.

The pyrolysis of organic materials produces a carbon that exhibits but diffuse x-ray reflections and therefore is referred to as x-ray amorphous. But it does have small periodic regions in which certain deviations from the ideal crystalline structure occur, and therefore the carbon in question is frequently referred to as paracrystalline carbon. Glassy microporous carbon has a lower density at 1.2-1.6 g/cm$^3$ than crystalline graphite at 2.2 g/cm$^3$, and a narrow pore size distribution. Owing to its high proportion of open porosity, carbon is very useful as adsorbent.

WO 2012/041998 A1, the entire disclosure of which is incorporated by reference herein, discloses the synthesis of carbon membranes by use of polyesters. The membranes are obtained by pyrolysis of a thin deposited film and have very narrow pore size distributions and average pore diameters <0.45 nm. These membranes allow size-selective removal of small gas molecules, such as $H_2O$, $H_2$, He, $N_2$. WO 2012/041998 A1 also discloses references for further reading.

EP 2 045 001 A1, the entire disclosure of which is incorporated by reference herein, discloses the employment of phenolic resins, melamine resins, urea resins, furan resins, polyimide resins or epoxy resins and also of polyethylene, cellulose-based resins dissolved in organic solvents in the manufacture of carbon membranes by film formation and subsequent pyrolysis of the resin.

Precursors preferred for the synthesis of isotropic carbon products generally are hydrocarbon-based polymers which, after pyrolysis, leave behind a high proportion of microcrystalline carbon and decompose with shape stability (see for instance Fitzer, E., 1980: [in German] "Thermal Degradation of Polymers to Elemental Carbon—a Route to Engineered Materials of the Future"; Angewandte Chemie 92: 375-386), the entire disclosure of which is incorporated by reference herein. This also holds for the synthesis of carbon membranes. Coatings have the advantage that the layer thickness of the precursor polymer employed as starting material can be used to control the layer thickness of the as-pyrolyzed layer of carbon. Decomposition with shape stability is desirable for coating complex geometries of carriers, also prevents any melting and restructurization into the more energetically advantageous form of graphite and also the creation of defects (e.g., pinholes), which may be caused by gaseous decomposition products escaping. Polymers such as phenolic resin or polyfurfuryl alcohol are accordingly obvious for the synthesis of carbon membranes, since 35 wt % and 55 wt %, respectively, of the polymer remain behind as carbon after pyrolysis (e.g., Böder, H. and Fitzer, E., 1970: [in German] "New Forms of Carbon"; Naturwissenschaften, 57: 29-36, the entire disclosure of which is incorporated by reference herein).

U.S. Pat. No. 8,608,828 B2, the entire disclosure of which is incorporated by reference herein, describes the deposition of polymeric precursors on a ceramic carrier pretreated at a temperature lower than the temperature for pyrolyzing the polymeric precursor to carbon. The result is carrier pore widening, and this leads to membranes having a particularly high flux.

The utilization of differingly prepared carbon for a wide variety of separation duties has been extensively described. Carbon membranes are thus utilized for hydrogen removal from hydrocarbons, which is described in US 2003/083534 A1, the entire disclosure of which is incorporated by reference herein, by way of example.

Carbon membranes deposited on ceramic carriers are utilized in JP19960263695, the entire disclosure of which is incorporated by reference herein, for the removal of trace impurities, such as trihalomethane, from polar solutions, such as water and ethanol. The hydrophobicity of the material is intentionally utilized here in order to avoid any permeation of the solvents, whereas the trace impurity is said to adsorb on the surface of the carbon. The same principle is utilized according to US 2003/034295 A1, the entire disclosure of which is incorporated by reference herein, in the removal of bovine serum albumin (BSA) from water, while porous metallic carriers are utilized to support the carbon membrane.

Hollow carbon fiber membranes produced by pyrolysis of sulfonated polyphenylene oxide at 600° C. were successfully employed to separate water from propanol by pervaporation (Yoshimune, M., Mizoguchi, K., Haraya, K., 2013: "Alcohol dehydration by pervoration using a carbon hollow fiber membrane derived from sulfonated poly(phenylene oxide)", Journal of Membrane Science 425: 149-155, the entire disclosure of which is incorporated by reference herein). However, the permeation of propanol was also observed, which suggests pores >0.45 nm. The presence of oxygen and hence of polar sites in the material was also suspected, which would suggest a preferential adsorption of water. The membranes concerned are adsorptive selective carbon membranes (ASCMs), employed in a liquid phase.

The problem underlying the present invention is that of proposing an alternative permselective membrane for removal of water vapor from gas mixtures. The problem underlying the present invention is further that of proposing processes for producing permselective membranes and also assemblies comprising such membranes and uses of such membranes.

SUMMARY OF THE INVENTION

The problem is solved by the subject matter of the independent claims. Dependent claims specify advantageous embodiments.

The problem is solved by a permselective membrane for separation of water vapor from gas mixtures, said permselective membrane being a carbon membrane of a material whose structure is graphite similar and formed by at least one sequence of layers of the material. The layers of the material are arranged in planes. Adjacent layers have an average spacing of less than 0.45 nm (4.5 Å) between said layers. The sequence of layers is turbostratically disordered.

As known from the above-cited document WO 2012/041998 A1, amorphous or microcrystalline films of carbon have a high level of chemical inertness. They possess $sp^2$ and $sp^3$ bonds and therefore display properties between those of graphite and diamond. The structures which are graphite similar consist of a turbostratically disordered sequence of layers wherein highly deformed and disoriented layers of graphite link the microcrystallites present.

Employment of nanoporous carbon as a material of construction for membranes is capable of yielding high permeances coupled with high selectivity because, in contradistinction to polymer membranes, gas permeation does not require any dissolving in the matrix, but can take place by diffusion through the lattice plane spacings (pores) of the carbon.

When the lattice plane spacings are sufficiently small and there are no further heteroatoms in the lattice which lead to the formation of polar sites, gas mixtures having different molecular diameters are separated by virtue of the size exclusion of the larger variety of the molecules. A carbon membrane of this type is referred to as a molecular sieve carbon membrane (MSCM). The permeation of gases can then be thought of in the ideal case as purely gas diffusion. When, however, additional heteroatoms are situated between the graphitic planes of layers, which leads firstly to a widening of the lattice plane spacings and hence pore enlargement and secondly to the incorporation of polar sites, the permeation of adsorbable gases, such as $CO_2$ for example, is determined by surface diffusion processes. These types of carbon membranes are then referred to as adsorptive selective carbon membranes (ASCMs). Separation takes place as a result of the selective adsorption and surface diffusion of a component onto the low pressure side of the membrane, where the component finally desorbs. In mixtures of adsorbable and nonadsorbable gases, the permeation of the nonadsorbing component is hindered by the adsorbed gas molecules. The nonadsorbing gases first have to overcome a potential barrier if they are to diffuse through the membrane. ASCMs enable the separation of gas mixtures having similar molecular radii or even the separation of larger from smaller molecules. Average pore size in an MSCM is in the range <0.45 nm. Average pore size in an ASCM is distinctly greater at 0.45-0.70 nm.

Separation properties of carbon membranes are controllable via the choice of precursor and of the conditions of synthesis. A further advantage to carbon as a membrane material is the possibility—even after synthesis—of removing or intercalating heteroatoms into the existing lattice plane structure by thermochemical treatment, making it possible for membranes having different permeation and separation properties to be prepared from the same starting material.

An MSCM with a low pore size <0.45 nm will have but few heteroatoms in the lattice, and therefore there are nearly no polar sites. The material is in effect hydrophobic, as was evidenced by determining the contact angle for sessile drops of water. The rate of permeation of gas molecules, such as water, hydrogen, carbon dioxide, oxygen, nitrogen or methane, will decrease with increasing gas molecule diameters. Water will accordingly have the highest rate of permeation. Nonetheless, in the mixture of gaseous water with other gases, there will still be some permeation by the other gases.

A permselective membrane according to the present invention (also referred to as just membrane for short) has but few defects having a size >0.45 nm in its structure (<<1% of all the pores present are greater than 0.45 nm), which is why a more than 5000 times higher permeation is found for hydrogen than for n-butane.

The material of the membrane is preferably hydrophobic on its free surfaces at least.

A permselective membrane according to the present invention may be present as a layer on a porous ceramic carrier, resulting in a membrane assembly. In the assembly, the membrane may be applied to the carrier by known methods. A possible example is to coat the carrier with a precursor to the membrane and to pyrolyze the precursor layer on the carrier.

Surprisingly, when using an MCSM in said mixture of gaseous water and other gases (water-containing gas mixture), water was found to completely block the micropores, giving exclusive permeation of water coupled with complete retention of other gases. This was even shown at very high temperatures up to 300° C.

A permselective membrane according to the present invention or an assembly comprising said membrane on a carrier is useful to remove water from chemical equilibrium reactions, the equilibrium reactions taking place in the presence of a water-containing gas mixture.

The present invention describes a process for preparing carbon membranes having sufficiently small pores and permitting, by pore condensation of water, the removal of water from gas mixtures at high temperatures and pressures while ensuring nearly complete retention of all other gas molecules.

The process of the present invention consists in coating a porous supporting body with a polymer, such as polyimide, polyfurfuryl alcohol, phenolic resin, polysaccharides, but preferably with an unsaturated polyester as precursor and then pyrolyzing the coating under inert conditions at temperatures between 500° C. and 1200° C. to form a carbon membrane. The carbon has a graphite-similar structure comprising a turbostratically disordered sequence of layers wherein highly deformed and disoriented layers of graphite link the microcrystallites, which have a size such that they are x-ray amorphous. Microcrystallinity and random orientation enable the permeation of small gas molecules through the lattice plane spacings of the carbon in any desired spatial direction.

The interplanar spacing is <0.45 nm, the particular interplanar spacing being defined as a pore. The carbon membrane exhibits exclusively a size-selective separation behavior. The free surfaces of the carbon membrane are hydrophobic.

The membrane according to the invention has the particular advantage that it separates water from water-containing gas mixtures at elevated temperature up to 400° C. by condensation of water in the pores. In the process, the pores become impermeable to other gases of the gas mixture. The membrane is also characterized by its interplanar spacing <0.45 nm, and its hydrophobic free surfaces as well as its capacity for the above-described condensation of water in its pores.

The carbon membranes of the present invention are prepared by deposition and pyrolysis of a polymeric precursor, preferably solutions of ethylenically unsaturated polyesters, on a porous ceramic carrier and by subsequent pyrolysis under inert conditions.

The carrier in question may comprise a layered construction which is asymmetric and in which the membrane is arranged on a sequence of interlayers of porous substrates wherein the individual interlayers have mutually different porosities. The porosity may decrease in the direction of the membrane. Useful porous substrates include materials such as porous metals, porous ceramics, porous glasses or porous composites thereof.

The porous substrate preferably comprises a mesoporous ceramic-type oxide layer of $TiO_2$, $ZrO_2$, $Al_2O_3$, $SiO_2$ or mixtures thereof, which is coated with the solution of the ethylenically unsaturated polyester or some other polymeric precursor. It is particularly preferable for the mesoporous ceramic-type oxide layer to be constructed of $\gamma$-$Al_2O_3$ as per the above-cited document U.S. Pat. No. 8,608,828 B2.

The coating of the porous carrier may be effected by immersion, spraying, impregnating processes, etc. The coating may be formed of one or more layers of precursor solution. A dipcoating process is preferably employed to apply the precursor solution.

A drying step follows at 17° C. to 30° C. for a period of two or more hours. This may be followed by a step of curing the layers at temperatures between 30° C. and 250° C. to reduce the flowability of the precursor. The pyrolysis of the polymer coating on the porous substrate to form the carbon membrane is preferably carried out under an inert gas at temperatures in the range from 500 to 1200° C., more preferably from 650 to 750° C. The holding period during this pyrolysis is preferably in the range from 0.5 to 17 hours, more preferably from 1 to 2 hours.

The pyrolysis produces highly porous carbon, the pore sizes of which vary according to precursor type and morphology and the pyrolysis conditions. The pyrolysis conditions have some influence on the separation properties attainable for the carbon membrane obtained. Heating rate, pyrolysis temperature and pyrolysis time are adjustable variables here.

The carbon membrane obtained according to the present invention has an average pore diameter <0.45 nm. These membranes only allow molecules to pass which have a smaller kinetic gas diameter and are able to penetrate into the pore system of the membrane. Helium, hydrogen, ammonia, carbon dioxide, oxygen, nitrogen and methane are concerned here in particular. The mechanism involved in separating these gases is not based on some differential adsorption and transportation behavior among the gases to be separated, but is one of size-selective separation (molecular sieving). Water is an exception, however. Water is capable even at high temperatures up to 400° C.—of condensing in the pores of the membrane and of completely blocking the pores to the permeation of other gases.

Once a water vapor partial pressure difference is established across the membrane, the selective transportation of water out of gas mixtures takes place through the micropores of the MSCM. Other gases which, by virtue of their small kinetic molecular diameter, could likewise penetrate into the pores are prevented by the condensed water from permeating through the pores. As a result, it is exclusively water which permeates, all the other gases being fully retained.

A water vapor partial pressure difference becomes established when, for example, the concentration of water is lower on the membrane side facing away from the water-containing gas mixture (hereinafter also referred to as the permeate side or permeate space) than on the membrane side facing the water-containing gas mixture (the side which hereinafter is also referred to as feed side, reactant side or reactor space). In lieu or addition, a lower temperature may be established in the permeate space than in the reactor space.

The membrane is useful for drying hot gases as may be generated in combustion processes for example. In this case, any cooling of the gas stream of the combustion products downstream of the combustion process for the purposes of condensing out the water can be avoided.

The membranes are particularly useful for removing water from chemical equilibrium reactions where water is formed as a product. The removal of water can be used to shift the equilibrium toward the side of product formation.

A further application is that of exchanging water between two gas streams with or without heat transfer, as for example in the moistening and heating of gases flowing into a polymer electrolyte fuel cell (PEM fuel cell) with water removed from the moist and hot offgases of the polymer electrolyte fuel cell. In this case, the excess water content of the offgases and the low or nonexistent water content of the inflowing gases engenders a water vapor partial pressure difference between a reactor space, containing the offgases, and a permeate space as formed, for example, by a feed pipe or by any space allowing flow therethrough. The position of the membrane is between the reactor space and the permeate space.

BRIEF DESCRIPTION OF THE DRAWINGS

Exemplary embodiments of the invention will now be more particularly described with reference to the drawings, where FIG. 4 shows a first table presenting values of quantified permeances versus the kinetic molecular diameter of various gases, and FIG. 5 shows a second table presenting values of quantified permeances of various gases at various temperatures and pressures.

DETAILED DESCRIPTION OF EXEMPLARY EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show details of the present invention in more detail than is necessary for the fundamental understanding of the present invention, the description in combination with the drawings making apparent to those of skill in the art how the several forms of the present invention may be embodied in practice.

Example 1

A membrane 1 was prepared as a carbon membrane as per the above-cited document WO 2012/041998 A1. The precursor solution was prepared by reacting a diol with at least one unsaturated carboxylic acid to form an unsaturated polyester and subsequently admixing an olefin. A 250 ml two-neck flask was charged with 19.98 g of 1,2-propanediol (0.25 mol+5% excess), 12.26 g of maleic anhydride (0.125 mol) and 18.52 g of phthalic anhydride (0.125 mol). This was followed by the addition of 0.01 g of hydroquinone as a polymerization inhibitor in order to inhibit premature polymerization or crosslinking processes. The initially charged raw materials were heated under nitrogen to a reaction temperature of 200° C. by means of an oil bath. To police the level of chain formation, the acid number was determined at regular intervals by titration with KOH solution. At an acid number of about 50, the reaction was discontinued by rapid cooling to 140 C. Using a dropping funnel, 50 g of styrene were subsequently admixed as a crosslinker under vigorous agitation in the course of one minute. The styrene added was previously heated to 50 C. In order to inhibit any premature polymerization of the polyester-styrene mixture, the unsaturated polyester resin solution was cooled down to room temperature in a water bath. Thereafter, the polyester-styrene mixture was admixed with 1% of dibenzoyl peroxide as a free-radical former and subsequently stirred at room temperature for 5 minutes.

Figure 1:
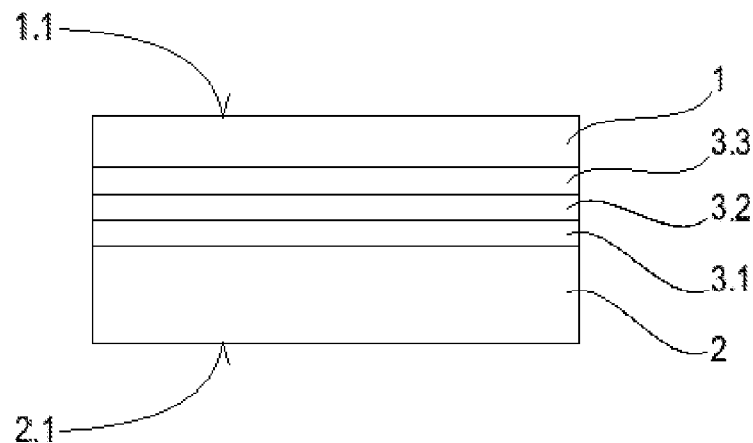
FIG. 1 shows an exemplary embodiment of an assembly comprising a membrane according to the invention in an arrangement on a carrier and a sequence of interlayers.
Figure 3:
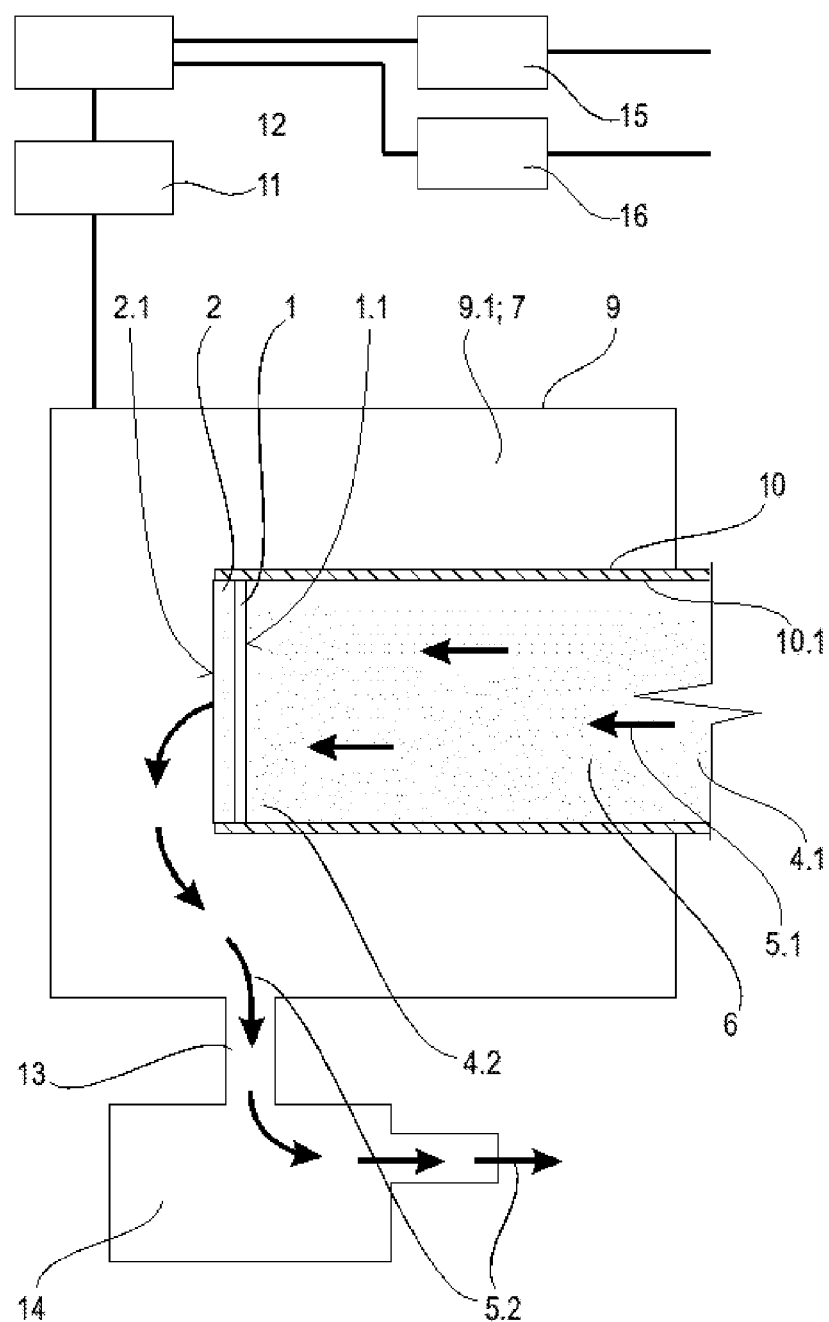
FIG. 3 shows a second exemplary embodiment of an apparatus according to the invention as a partial schematic section through a reactor system.

Carriers 2 as used for membranes 1 (FIG. 1; FIG. 3) were ceramic monochanneled tubes of $\alpha$-$Al_2O_3$ having a length of 250 mm, an internal diameter of 7 mm and an external diameter of 10 mm and equipped on the inside surface with interlayers 3.1 to 3.3 in decreasing pore size. A (topmost) third interlayer 3.3 utilized a $\gamma$-$Al_2O_3$ layer having a pore size of 5 nm and a thickness of 1-2 μm.

Further embodiments of the process and of membranes 1 may comprise different numbers of interlayers or no interlayers. In addition, the interlayers which are present may have average pore sizes other than those reported above.

The $\gamma$-$Al_2O_3$ layer was dipcoated with the clear, viscous and slightly yellowish precursor solution. To this end, said solution was introduced into the tube, left therein for a residence time of 1 minute and then pumped out again. The coating thus obtained was air dried for 24 h and subsequently cured in a drying cabinet at a temperature of 80° C. for 12 h. After said crosslinking of the polymer to form a thermoset, the coating was decomposed into carbon at a temperature of 800° C. under nitrogen and argon to obtain an assembly comprising membrane 1 and carrier 2.

FIG. 1 is not true to scale in its simplified illustration of an exemplary embodiment of an assembly comprising a membrane 1 arranged on a carrier 2 composed of a porous material. Interposed between carrier 2 and membrane 1 are a first interlayer 3.1 having a pore size of 0.1 to 3 μm, a second interlayer 3.2 having a pore size of 0.01 to 0.5 μm and a third interlayer 3.3 having a pore size of 0.3 to 20 nm. Membrane 1 has a free side, which FIG. 1 shows as upwardly facing and which constitutes reactant side 1.1, while carrier 2 has a side which FIG. 1 shows as downwardly facing and which constitutes the permeate side 2.1 of the assembly.

Figure 2:
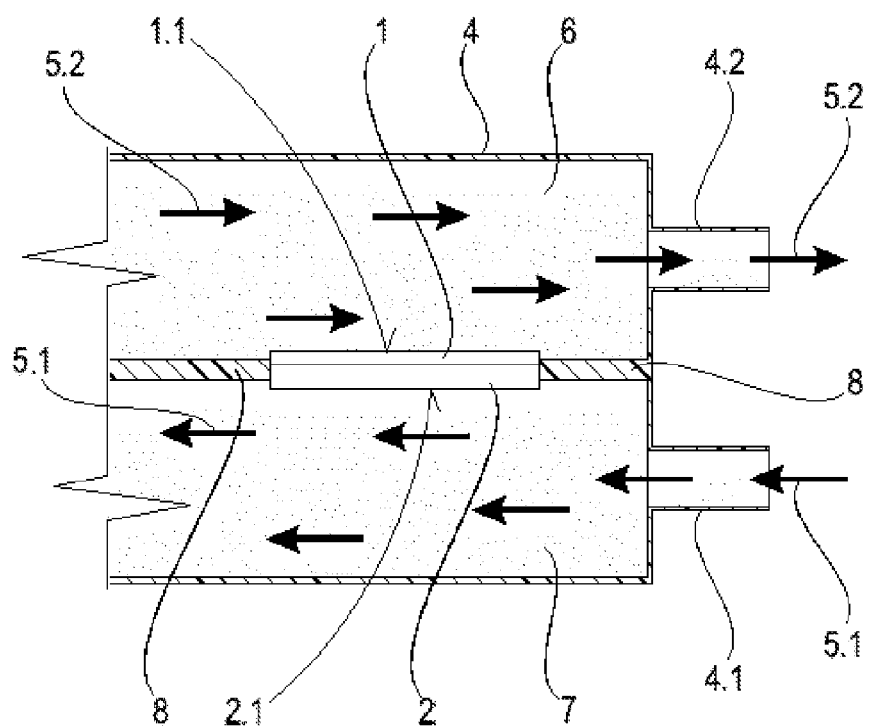
FIG. 2 shows a first exemplary embodiment of an apparatus according to the invention as a partial schematic section through a region of a polymer electrolyte fuel cell.

FIG. 2 shows a schematic illustration of a first exemplary embodiment of an apparatus according to the invention as a partial section through a region of a polymer electrolyte fuel cell (PEM fuel cell 4). Said region, shown in but greatly simplified form, of PEM fuel cell 4 contains a reactor space 6 and a permeate space 7, separated from each other by a dividing wall 8. An assembly comprising a membrane 1 arranged on a carrier 2 is present in said dividing wall 8 to allow molecules to transition between said reactor space 6 and said permeate space 7. Membrane 1 faces with its reactant side 1.1 into the reactor space 6 while carrier 2 faces with its permeate side 2.1 into the permeate space 7.

The inflowing gas 5.1 is substantially free from water and has an inlet temperature. It passes via the media feed line 4.1 into the permeate space 7, flows therethrough and then passes into further regions of the PEM fuel cell 4 (not depicted). An offgas 5.2, which contains water and has a temperature that is higher than the inlet temperature of the inflowing gas 5.1, flows through the reactor space 6. Owing to the water vapor partial pressure difference between the reactor space 6 and permeate space 7, water passes into membrane 1 on reactant side 1.1 and condenses in the pores of membrane 1. Said membrane 1 is then blocked to atoms and molecules of other compounds and elements, whereas water is able to permeate through said membrane 1. A fraction of the water in offgas 5.2 thus passes through membrane 1 and carrier 2 into permeate space 7 and is absorbed by the inflowing gas 5.1. At the same time, the inflowing gas 5.1 receives the heat which the permeated water possesses in excess as compared with the inlet temperature of inflowing gas 5.1. The non-permeating fraction of offgas 5.2 is conducted out of reactor space 6 via a media exit line 4.2.

FIG. 3 is a schematic depiction of a second exemplary embodiment of an apparatus according to the invention as a partial schematic section through a reactor system. A housing 9 encloses an interior 9.1 which also acts as permeate space 7. A hollow body 10 configured as a tube projects into said interior 9.1. One end of hollow body 10 projects out of said housing 9 and is configured as a first opening which serves as media feed line 4.1 to introduce a water-containing gas mixture as inflowing gas 5.1 into said hollow body 10. One end of hollow body 10 is arranged in said interior 9.1, is configured as a second opening and is sealed by an assembly comprising a membrane 1 arranged on a carrier 2. The second opening serves as media exit line 4.2 to remove the offgas 5.2 from reactor space 6. Reactant side 1.1 faces into the inside of hollow body 10, which constitutes the reactor space 6. The permeate side 2.1 faces into the permeate space 7. The assembly comprising membrane 1 and carrier 2 is gastightly sealed off at an inside wall 10.1 of hollow body 10, so atoms and molecules can only pass from the reactor space 6 into the permeate space 7 through the assembly comprising membrane 1 and carrier 2.

The permeate space 7 communicates via a gas line 13 with a cold trap 14, into which permeate can be conducted from the permeate space 7 in a controlled manner. The permeate space 7 connects to a vacuum pump 11 serving to reduce the pressure in the interior 9.1 relative to a pressure in the hollow body 10. There are further a pressure adjuster 15 and temperature adjuster 16 whereby pressure conditions and temperatures are adjustable in said interior 9.1 of said housing 9 and in said hollow body 10 (connections are merely indicated).

Vacuum pump 11, pressure adjuster 15 and temperature adjuster 16 are in signal communication with a control unit 12. In further embodiments of the apparatus according to the present invention, the control unit 12 may additionally control a flow rate through gas line 13 and/or the operating parameters of cold trap 14, for example its temperature, coolant supplied and removed, flow rate of the permeate.

In a further embodiment of the apparatus according to the present invention, the hollow body 10 may be configured, at least via its sections protruding into the interior 9.1/permeate space 7, as a carrier 2 and carry a membrane 1. Such a design provides a large area of transition between reactor space 6 and permeate space 7 (see Example 4).

The Examples which follow are elucidated by making reference to one or more of FIGS. 1 to 5 as and when appropriate.

Example 2

A membrane 1 is prepared as per Example 1 (FIG. 1) except that carrier 2 is used in the form of a porous flat disk of α-Al$_2$O$_3$ having a thickness of 2 mm and a diameter of 18 mm and equipped on its upper side with interlayers 3.1 to 3.3 in decreasing pore size. The third interlayer shown as topmost interlayer, interlayer 3.3, is a γ-Al$_2$O$_3$ layer having a pore size of 5 nm and a thickness of 1-2 μm. Carrier 2 is coated by immersing the carrier surface in the precursor solution for one minute. This is followed by whizzing off at 500 rpm for one minute. Drying and pyrolysis are carried out similarly to example 1. An assembly comprising an arrangement of membrane 1 and carrier 2 with interlayers 3.1 to 3.3 is obtained.

Example 3

An assembly prepared according to Example 2 and comprising a membrane 1 on a flat carrier 2 is inserted horizontally into a suitable measuring instrument, such as the Contact Angle System OCA20 from dataphysics. A cannula is used to place a water droplet having a volume of a few microliters onto reactant side 1.1 of membrane 1. A camera mounted to the side and an integrated evaluation software package in the instrument are used to determine the wetting angle of the water droplet on the carbon layer. Five drops of water are placed on membrane 1 and for each the wetting angle is measured from two sides. Then the average is computed. An average wetting angle of 94° was determined for the in-test membrane. The carbon material accordingly has hydrophobic properties.

Example 4

A membrane 1 prepared according to Example 1 is installed in a housing 9 of stainless steel (FIG. 3) whereby polymeric O-ring seals (not depicted) make a spatial separation between hollow body interior and hollow body exterior possible. The hollow body interior is subjected to a gas 5.1 (feed side, reactant side 1.1, reactor space 6). The absolute pressure is 1 bar, the temperature is 70° C. The hollow body exterior (permeate side 2.1) is evacuated with a vacuum pump 11 configured as a rotary valve vacuum pump. On reaching a pressure of <10 mbar in permeate space 7, a valve is closed to separate the vacuum pump 11 from the permeate space 7. The subsequent permeation of the gas from the reactant side 1.1 through the pores of membrane 1 onto the permeate side 2.1 and into permeate space 7 causes a pressure increase in the otherwise sealed-off permeate space 7. The pressure increase can be used to quantify the gas flow per unit time, membrane area and differential pressure (permeance). After measurement, the connection to vacuum pump 11 is restored and a renewed measurement is carried out once a pressure of <10 mbar in the permeate space 7 is reached. At least three measurements are carried out for any one gas and averaged. The measurements are repeated with various gases (see FIGS. 4 and 5 and also Examples 5 to 11).

A membrane 1 synthesized according to Example 1 gave the results tabulated in FIG. 4. The molecular hydrogen, molecular carbon dioxide, molecular oxygen, methane, hydrocarbons (alkanes) having the empirical formulae C$_3$H$_8$ and C$_4$H$_{10}$ and also sulfur hexafluoride listed are the gases introduced on the reactant side 1.1. The kinematic gas diameter is reported for each of these gases. The permeance found is reported in the bottommost row.

Permeance is found to decrease continuously with increasing kinetic molecular diameter from 0.29 nm (H$_2$) to 0.43 nm (C$_3$H$_8$). A size-selective permeation through the lattice plane spacings of the carbon is concerned here. For molecules having a kinetic molecular diameter ≥0.43 nm, the decrease in permeation is down to a very low rate. This permeation is permeation resulting from the presence of membrane defects. The measurements suggest a very low proportion of defects in membrane 1. The lattice plane spacing in the carbon is 0.38 nm<d<0.43 nm. Elevated permeances are not observed for polar molecules, such as CO$_2$. A molecular sieve membrane 1 (MCSM) is concerned.

Example 5

A membrane 1 prepared according to Example 1 is installed in an apparatus as described in Example 4. The inside wall 10.1 of the tubular hollow body 10 is subjected to a gaseous mixture of 0.5 N$_2$/0.5 H$_2$O (=inflowing gas 5.1, reactants) at a temperature of 200° C. The absolute pressure ($p_{feed}$) is 11 bar, the volume flow is 100 (S.T.P.) l/h. The outside of hollow body 10 is under atmospheric pressure ($P_{permeate}$=1 bar absolute). The gas stream flowing away from the outside surface of hollow body 10 and from permeate space 7 (=offgas 5.2) is routed through a cold trap 14, the cooling temperature of which is −25° C. The gas stream emerging from the cold trap 14 as cooled offgas 5.2 flows through a bubble counter (not depicted).

At the start of the experiment, the gas stream through the bubble counter is observed to be low at 20 (S.T.P.) ml/mm. After a few minutes, the gas stream is observed to drop to 0 (S.T.P.) ml/min. At the same time, water is observed to condense and freeze out in cold trap 14. Water flux through membrane 1 is about 5 m$^3$/(m$^2$·h·bar). It is exclusively water which permeates through the pores of membrane 1. Nitrogen is fully retained by membrane 1.

Example 6

The same setup and the same procedure are chosen as in Example 5. While maintaining all the parameters, the temperature is incrementally increased to 300° C. Nonetheless, it is exclusively the permeation of water which is observed through membrane 1.

Example 7

The same setup and the same procedure are chosen as in Example 5. While maintaining all the parameters, the pressure ($p_{feed}$) in reactor space 6 is incrementally reduced to 4 bar. A minimal permeation of nitrogen is observed at a flux of 0.025 m$^3$/(m$^2$·h·bar) in addition to the permeation of water. The water no longer blocks all the pores. Individual membrane defects are free from water, allowing some transportation of nitrogen as well.

Example 8

The same setup and the same procedure are chosen as in Example 5. Reactor space 6 is fed with a gaseous mixture of 0.5 H$_2$/0.5 H$_2$O. But a minimal permeation of molecular hydrogen is observed at a flux of 0.055 m$^3$/(m$^2$·h·bar) in addition to the permeation of water. Individual membrane defects are free from water, allowing some transportation of hydrogen as well.

Example 9

The same setup and the same procedure are chosen as in Example 5. Reactor space 6 is fed with a gaseous mixture of 0.5 CO$_2$/0.5 H$_2$O. But a minimal permeation of molecular carbon dioxide is observed at a flux of 0.03 m³/(m²·h·bar) in addition to the permeation of water. Individual membrane defects are free from water, allowing some transportation of carbon dioxide as well.

Example 10

The same setup and the same procedure are chosen as in Example 5. Reactor space 6 is fed with a gaseous mixture of 0.5 CH$_4$/0.5 H$_2$O. It is exclusively the permeation of water which is observed. On increasing the temperature to 250° C., again only the permeation of water is observed. Methane is fully retained by membrane 1.

Example 11

The same setup and the same procedure are chosen as in Example 5. The reactor space 6 is fed with a gaseous mixture of 0.3 H$_2$/0.2 CO$_2$/0.2 CH$_4$ and 0.3 H$_2$O. But a minimal permeation of hydrogen and carbon dioxide is observed in addition to the permeation of water. Individual membrane defects are free from water, allowing some transportation of hydrogen and carbon dioxide as well.

The results of the tests as per Examples 5, 6 and 8 to 11 are summarized in the Table of FIG. 5.

Example 12

A membrane 1 was prepared by use of phenolic resin. In fact, two phenolic resin powders were used (FB8001; FERS and 0235DP; HEXION). The first phenolic resin powder FB8001 was reported by its manufacturer to have a hexamine content of 8.9% and an average molar mass of 2625 g/mol for the novolak. The second phenolic resin powder 0235DP had an average molar mass of 900 g/mol for the novolak. Optimization of the precursor chemistry led to a mixture consisting of 7.5 g of each of the first and second phenolic resin powders, which were each initially dissolved in 22.5 g of methanol. A mixture of the dissolved first and second phenolic resin powders was then admixed with 20 g of 1-methyl-2-pyrrolidone (≥99.5%). The ensuing reaction turned the dissolved phenolic resin powders into a golden brown polymer solution obtained as phenolic resin precursor.

The phenolic resin precursors obtained were applied to γ-Al$_2$O$_3$ carrier membranes in monochanneled tube geometry as described in Example 1. The coating of inside wall 10.1 of the Al$_2$O$_3$ monochanneled tubes was effected by dipcoating for one minute. The phenolic resin layers were initially air dried and later made to fully crosslink in the course of 3 hours at a temperature of 150° C. The decomposition of the polymer into carbon was effected by pyrolysis under a nitrogen/argon atmosphere at 800° C.

Example 13

A membrane 1 was prepared via furfuryl alcohol. A standard formulation was developed, from a formulation as per U.S. Pat. No. 3,859,421 A, in the form of a composition consisting of 90 ml of furfuryl alcohol (>98%), 18 ml of pyrrole (≥97%), 45 ml of polyethylene glycol methyl ether 750 and 3 ml of concentrated HNO$_3$ as catalyst. The cooled pyrrole stored in a refrigerator was warmed to room temperature and added to the furfuryl alcohol to form a mixture. The polyethylene glycol methyl ether was initially heated to melting point, and melted, in a water bath and the melt was added to the mixture under constant agitation. The catalyst was slowly added dropwise to the solution at a rate of 0.05 ml/300 s. This reaction mixture was permanently cooled in a water bath during the strongly exothermic polymerization reaction. After all the catalyst had been consumed, a black polymer solution had formed. The polyfurfuryl alcohol precursors (PFA precursors) thus obtained were coated onto γ-Al$_2$O$_3$ carriers 2 as described in Examples 1 and 12. The layers of the PFA precursors were initially air dried and later made to fully crosslink at a temperature of 80° C. to form a crosslinked polymer. The decomposition of the polymer into carbon was effected by pyrolysis under a nitrogen/argon atmosphere at 800° C. Polymer shrinkage during pyrolysis is about 20%.

The aforementioned examples and exemplary embodiments are freely combinable with each other in the context of the present invention.

Although the present invention has been described in detail on the basis of the exemplary embodiments, it is self-evident to a person skilled in the art that the invention is not restricted to these exemplary embodiments, but rather that modifications are possible in such a way that individual features may be omitted or other combinations of features presented may be implemented without departing from the scope of protection of the accompanying claims. The present invention comprises in particular all combinations of all of the individual features presented.

LIST OF REFERENCE NUMERALS 1 membrane
1.1 reactant side
2 carrier
2.1 permeate side
3.1 first interlayer
3.2 second interlayer
3.3 third interlayer
4 PEM fuel cell
4.1 media feed line
4.2 media exit line
5.1 inflowing gas
5.2 offgas
6 reactor space
7 permeate space
8 wall
9 housing
9.1 interior
10 hollow body
10.1 inside wall (of hollow body 10)
11 vacuum pump
12 control unit
13 gas line
14 cold trap
15 pressure adjuster
16 temperature adjuster

What is claimed is:

1. A method for removing water from a gas mixture which contains water and at least one other gas, wherein the at least one other gas has a smaller kinetic gas diameter than water and wherein the method comprises selectively separating water by a carbon membrane of a material whose structure is similar to that of graphite and formed by at least one sequence of layers of the material, the layers being arranged in planes, adjacent layers having an average distance between the layers of less than 0.45 nm (4.5 Å), and the sequence of layers being turbostratically disordered.

2. The method of claim 1, wherein the material of the membrane is hydrophobic at least on its free surfaces.

3. The method of claim 1, wherein the membrane has been produced by pyrolysis of a polymeric precursor.

4. The method of claim 3, wherein the membrane has been produced by pyrolysis of an ethylenically unsaturated polyester.

5. The method of claim 1, wherein the at least one other gas comprises helium.

6. The method of claim 1, wherein the at least one other gas comprises ammonia.

7. The method of claim 1, wherein the membrane is present as a layer on a porous ceramic carrier.

8. The method of claim 7, wherein the porous ceramic carrier comprises a mesoporous ceramic-type oxide layer of $TiO_2$, $ZrO_2$, $Al_2O_3$, $SiO_2$, or mixtures thereof.

9. The method of claim 8, wherein the mesoporous ceramic-type oxide layer is made of $\gamma\text{-}Al_2O_3$.

10. The method of claim 1, wherein water is selectively removed from a chemical equilibrium reaction, the equilibrium reaction taking place in the presence of a gas mixture which contains water and at least one other gas which has a smaller kinetic gas diameter than water.

11. The method of claim 1, wherein water is exchanged between two gas streams.

12. The method of claim 1, wherein heating gases flowing into a PEM fuel cell are moistened and heated with water removed from moist and hot off-gases of the PEM fuel cell.

\* \* \* \* \*